United States Patent
Howard et al.

(10) Patent No.: US 11,120,485 B2
(45) Date of Patent: *Sep. 14, 2021

(54) APPLICATION PURCHASING

(71) Applicant: Apple Inc., Cupertino, CA (US)

(72) Inventors: James Alexander Howard, Mountain View, CA (US); William Bedford Turner, Campbell, CA (US); Christopher Blumenberg, San Francisco, CA (US); Richard Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/925,693

(22) Filed: Mar. 19, 2018

(65) Prior Publication Data

US 2018/0211295 A1    Jul. 26, 2018

Related U.S. Application Data

(63) Continuation of application No. 12/767,412, filed on Apr. 26, 2010, now Pat. No. 9,922,354.

(Continued)

(51) Int. Cl.
*G06Q 30/06* (2012.01)
*G06Q 30/02* (2012.01)
*G06F 3/0481* (2013.01)

(52) U.S. Cl.
CPC .......... *G06Q 30/06* (2013.01); *G06F 3/0481* (2013.01); *G06Q 30/02* (2013.01);

(Continued)

(58) Field of Classification Search
CPC .... G06Q 30/06; G06Q 30/02; G06Q 30/0251; G06Q 30/0253; G06Q 30/0277; G06Q 30/0641
See application file for complete search history.

(56) References Cited

U.S. PATENT DOCUMENTS 5,991,399 A    11/1999  Graunke et al.
6,038,567 A    3/2000   Young
(Continued)

FOREIGN PATENT DOCUMENTS

WO    2007052285    5/2007

OTHER PUBLICATIONS

International Search Report and Written Opinion dated May 9, 2011 for PCT/US2010/050207, filed Sep. 24, 2010, titled "Background Process for Providing Targeted Content Within a Third-Party Applciation," to Apple Inc.

(Continued)

*Primary Examiner* — Azam A Ansari
(74) *Attorney, Agent, or Firm* — Polsinelli LLC

(57) ABSTRACT

The present technology provides a purchasing interface within an application that allows users to purchase a product from another source without leaving the application. The application offers a product for purchase, and a user, desiring to purchase the product can provide an input effective to cause a purchasing interface to be displayed. While the purchasing interface, or information presented therein, comes from the product source, which is different than the application source, it is presented in such a fashion that gives the impression to the user that they are purchasing the product directly from the application.

23 Claims, 8 Drawing Sheets

Related U.S. Application Data

(60) Provisional application No. 61/320,666, filed on Apr. 2, 2010.

(52) U.S. Cl.
CPC ..... *G06Q 30/0251* (2013.01); *G06Q 30/0253* (2013.01); *G06Q 30/0277* (2013.01); *G06Q 30/0641* (2013.01); *G06F 2203/04804* (2013.01)

(56) References Cited

U.S. PATENT DOCUMENTS

| | | | |
|---|---|---|---|
| 6,141,010 A | 10/2000 | Hoyle | |
| 6,289,512 B1 | 9/2001 | Edwards et al. | |
| 6,363,524 B1 | 3/2002 | Loy | |
| 6,616,533 B1* | 9/2003 | Rashkovskiy | A63F 13/10 463/31 |
| 6,651,094 B1 | 11/2003 | Dean et al. | |
| 6,807,542 B2 | 10/2004 | Bantz et al. | |
| 6,999,976 B2 | 2/2006 | Abdallah et al. | |
| 7,069,554 B1* | 6/2006 | Stammers | G06F 9/445 709/220 |
| 7,155,713 B1 | 12/2006 | Burkhardt et al. | |
| 7,200,627 B2 | 4/2007 | Stickler | |
| 7,222,078 B2 | 5/2007 | Abelow | |
| 7,231,426 B1 | 6/2007 | Hall et al. | |
| 7,281,254 B2 | 10/2007 | Santo et al. | |
| 7,287,253 B2 | 10/2007 | Yamamura et al. | |
| 7,379,063 B2 | 5/2008 | Hoff | |
| 7,385,942 B2 | 6/2008 | Brady et al. | |
| 7,428,555 B2* | 9/2008 | Yan | G06Q 30/02 |
| 7,512,062 B2 | 3/2009 | Brady et al. | |
| 7,512,635 B1 | 3/2009 | Solin et al. | |
| 7,574,706 B2 | 8/2009 | Meulemans et al. | |
| 7,620,565 B2 | 11/2009 | Abelow | |
| 7,711,208 B2 | 5/2010 | Grunder | |
| 7,814,551 B2 | 10/2010 | Darweesh et al. | |
| 7,849,459 B2 | 12/2010 | Burkhart et al. | |
| 7,904,900 B2 | 3/2011 | Forsyth | |
| 7,934,210 B1 | 4/2011 | Stampfli et al. | |
| 7,937,672 B2 | 5/2011 | Casto | |
| 7,978,182 B2 | 7/2011 | Ording et al. | |
| 8,060,856 B2 | 11/2011 | Besbris et al. | |
| 8,132,120 B2 | 3/2012 | Stallings et al. | |
| 8,220,062 B1* | 7/2012 | Arankalle | G06Q 30/0241 705/14.4 |
| 8,307,288 B1* | 11/2012 | Smaltz | G06Q 30/02 715/733 |
| 2001/0047365 A1 | 11/2001 | Yonaitis | |
| 2003/0037026 A1 | 2/2003 | Bantz et al. | |
| 2003/0037325 A1 | 2/2003 | Hargrove et al. | |
| 2003/0182652 A1 | 9/2003 | Custodio | |
| 2004/0003389 A1 | 1/2004 | Reynar et al. | |
| 2004/0015608 A1 | 1/2004 | Ellis et al. | |
| 2004/0034850 A1 | 2/2004 | Burkhardt et al. | |
| 2004/0128583 A1 | 7/2004 | Iulo et al. | |
| 2004/0230676 A1 | 11/2004 | Spivack et al. | |
| 2004/0250247 A1 | 12/2004 | Deeths et al. | |
| 2005/0091111 A1* | 4/2005 | Green | G06Q 30/02 705/14.59 |
| 2005/0093891 A1 | 5/2005 | Cooper | |
| 2005/0195735 A1 | 9/2005 | Brady et al. | |
| 2005/0235273 A1 | 10/2005 | Travison et al. | |
| 2005/0240475 A1 | 10/2005 | Margiloff et al. | |
| 2005/0262501 A1 | 11/2005 | Marinelli et al. | |
| 2006/0010345 A1 | 1/2006 | Schnoebelen et al. | |
| 2006/0017692 A1 | 1/2006 | Wehrenberg et al. | |
| 2006/0031416 A1 | 2/2006 | Narin | |
| 2006/0074769 A1 | 4/2006 | Looney et al. | |
| 2006/0101453 A1 | 5/2006 | Burkhart et al. | |
| 2006/0140141 A1 | 6/2006 | Moon et al. | |
| 2006/0143515 A1 | 6/2006 | Kuramkote et al. | |
| 2006/0155790 A1 | 7/2006 | Jung et al. | |
| 2006/0195334 A1 | 8/2006 | Reeb et al. | |
| 2006/0224544 A1 | 10/2006 | Keith | |
| 2007/0006014 A1 | 1/2007 | Huang | |
| 2007/0033202 A1 | 2/2007 | Casto | |
| 2007/0050679 A1 | 3/2007 | Reddy | |
| 2007/0168462 A1 | 7/2007 | Grossberg et al. | |
| 2007/0229541 A1 | 10/2007 | Klassen et al. | |
| 2007/0266320 A1 | 11/2007 | Adams et al. | |
| 2008/0004954 A1* | 1/2008 | Horvitz | G06Q 30/02 705/14.49 |
| 2008/0025307 A1 | 1/2008 | Preiss et al. | |
| 2008/0033997 A1 | 2/2008 | Banker et al. | |
| 2008/0059545 A1 | 3/2008 | Brady et al. | |
| 2008/0065491 A1 | 3/2008 | Bakman | |
| 2008/0071810 A1 | 3/2008 | Casto et al. | |
| 2008/0140720 A1 | 6/2008 | Six et al. | |
| 2008/0143749 A1 | 6/2008 | Weybrew et al. | |
| 2008/0154738 A1 | 6/2008 | Jain et al. | |
| 2008/0208712 A1 | 8/2008 | Yerkes et al. | |
| 2008/0248834 A1 | 10/2008 | Chatterjee et al. | |
| 2008/0254775 A1 | 10/2008 | Rohs | |
| 2008/0275764 A1 | 11/2008 | Wilson et al. | |
| 2009/0002335 A1 | 1/2009 | Chaudhri | |
| 2009/0007093 A1 | 1/2009 | Lin | |
| 2009/0030982 A1 | 1/2009 | Spivack et al. | |
| 2009/0037239 A1 | 2/2009 | Wong et al. | |
| 2009/0037724 A1 | 2/2009 | Carlon et al. | |
| 2009/0043657 A1 | 2/2009 | Swift et al. | |
| 2009/0049407 A1 | 2/2009 | Casto | |
| 2009/0125343 A1 | 5/2009 | Cradick et al. | |
| 2009/0125376 A1 | 5/2009 | Sundaresan et al. | |
| 2009/0135919 A1 | 5/2009 | Vered et al. | |
| 2009/0171847 A2 | 7/2009 | Bhambri et al. | |
| 2009/0171906 A1 | 7/2009 | Adams et al. | |
| 2009/0204476 A1 | 8/2009 | Abraham et al. | |
| 2009/0207138 A1 | 8/2009 | Thorn | |
| 2009/0245837 A1 | 10/2009 | Sarkeshik | |
| 2009/0259941 A1 | 10/2009 | Kennedy, Jr. | |
| 2009/0289956 A1 | 11/2009 | Douris et al. | |
| 2009/0298480 A1 | 12/2009 | Khambete et al. | |
| 2009/0324100 A1 | 12/2009 | Kletter et al. | |
| 2010/0017385 A1 | 1/2010 | Wilcox et al. | |
| 2010/0049608 A1 | 2/2010 | Grossman | |
| 2010/0060664 A1 | 3/2010 | Kilpatrick et al. | |
| 2010/0066643 A1 | 3/2010 | King et al. | |
| 2010/0153831 A1 | 6/2010 | Beaton | |
| 2010/0169790 A1 | 7/2010 | Vaughan et al. | |
| 2010/0179991 A1 | 7/2010 | Lorch et al. | |
| 2010/0235733 A1 | 9/2010 | Drislane et al. | |
| 2010/0281458 A1 | 11/2010 | Paladino | |
| 2010/0312824 A1 | 12/2010 | Smith et al. | |
| 2010/0317332 A1 | 12/2010 | Bathiche et al. | |
| 2010/0317371 A1 | 12/2010 | Westerinen et al. | |
| 2011/0016427 A1 | 1/2011 | Douen | |
| 2011/0054834 A1 | 3/2011 | Partridge et al. | |
| 2011/0125755 A1 | 3/2011 | Kaila et al. | |
| 2011/0087529 A1 | 4/2011 | Angell | |
| 2011/0177774 A1 | 7/2011 | Gupta et al. | |
| 2011/0177775 A1 | 7/2011 | Gupta et al. | |
| 2011/0202947 A1 | 8/2011 | Gupta et al. | |
| 2011/0202966 A1 | 8/2011 | Gupta et al. | |
| 2011/0209181 A1 | 8/2011 | Gupta et al. | |
| 2011/0210922 A1 | 9/2011 | Griffin | |
| 2012/0054664 A1 | 3/2012 | Dougall et al. | |
| 2012/0210259 A1 | 8/2012 | Bederson et al. | |

OTHER PUBLICATIONS

H. Federrath, 0. Berthold, M. Kohntopp and S. Kopsell, "Tarnkappen Fuers Internet Verfahren Zur Anonymen Und Unbeobachtbaren Kommunikation", CT Magazin Fuer Computer Technik, Heise Zeitschriften Verlag, Hannover, DE, No. 16, Jul. 31, 2000.

Joris Claessens, Bart Preneel and Joos Vandewalle, "Solutions for Anonymous Communication on the Internet," Security Technology, 1999. Proceedings. IEEE 33rd Annual 1999 International Carnahan Conference on, Madrid, Spain, Oct. 5-7, 1999, pp. 298-303, IEEE, Piscataway, NJ, USA, Oct. 5, 1999.

(56) References Cited

OTHER PUBLICATIONS

Collberg, Christian et al., "A Taxonomy of Obfuscating Transformations", Technical Report #148, Department of Computer Science, University of Aukland, Jul. 1997.
Judd, Christopher M. et al., "Web Packaging and Deployment", Pro Eclipse JST: Plug-ins for J2EE Development, Ch. 14, Apress, Berkeley, CA, pp. 241-261, Sep. 8, 2005, Ch. 14, pp. 241-261.

* cited by examiner

APPLICATION PURCHASING

CROSS REFERENCE TO RELATED APPLICATIONS

This application is a continuation of U.S. application Ser. No. 12/767,412 entitled "IN APPLICATION PURCHASING", filed on Apr. 26, 2010 which in turn, claims the benefit of U.S. Provisional Patent Application No. 61/320,666, entitled "IN APPLICATION PURCHASING", filed on Apr. 2, 2010, which are hereby expressly incorporated herein by reference in their entirety.

FIELD

The following relates to presenting a purchase interface and more specifically relates to presenting a purchase interface within an application.

BACKGROUND

Converting sales from an application offering a product for purchase or from an advertisement can be difficult task. Consumers can be extremely fickle and accordingly many different things can cause a consumer to walk away from a potential purchase. Each step in the purchasing process presents a new opportunity for the consumer to decide not to purchase a product.

When purchasing products offered for sale or advertised in a computer application, a user is required to select the product for purchase and then to navigate to the online store offering a product for sale where the user can purchase the product. Such navigation often takes a user away from the interface or application which presented the product in a favorable light and introduces additional opportunities for the user to not purchase the product, which is undesirable.

SUMMARY

Accordingly, the present technology provides a purchasing interface within an application that allows users to purchase a product from another source without leaving the application. The application offers a product for purchase, and a user, desiring to purchase the product can provide an input effective to cause a purchasing interface to be displayed. While the purchasing interface, or information presented therein, comes from the product source, which is different than the application source, it is presented in such a fashion that gives the impression to the user that they are purchasing the product directly from the application.

The present technology presents a targeted application, which is an application having content targeted to the user. The targeted application can advertise a product for purchase within the application, or the application can be an interactive advertisement itself. If the user is enticed to purchase the product by the targeted application, the targeted application can call for a purchasing interface from the online store offering the product for purchase.

The purchasing interface can be displayed as a transparent or translucent overlay allowing the targeted application to be viewed through the purchasing interface. The combined purchasing interface and targeted application give the user the impression that both interfaces are from the same source and further give the impression that the user is still interacting with the targeted application. Importantly, the user never navigates away from the targeted application.

Upon completion of the transaction, the user is returned to the targeted application or to another application, referred to herein as the primary application.

In some embodiments of the technology, the targeted application can be an HTML application, such as an HTML5 application, video, game, puzzle, advertisement, image or any other suitable application.

DESCRIPTION

The technology described herein relates to presenting a targeted application within a primary application whereby the targeted application can be identified using a background process to access sensitive data that must be treated with due care appropriate to its sensitive nature.

The background process works as a daemon to respond to requests for a targeted application from the primary application. The daemon can have access to sensitive information that should not be shared with third-party applications and using the sensitive data, it can determine which targeted application should be returned to the primary application.

Such sensitive data can be application-targeting data, which can be used to deliver content that is targeted to a user of a device. The application-targeting data can include information about the device or about the user. For example, application-targeting data can include information identifying: the type of the device, applications loaded or running on the device, preferences, frequently viewed websites, frequently used applications, global positioning system data (GPS data), the operating system, etc. Due to the sensitive nature of much of this data, it is important that this data not be shared with third-party developers who could misuse the data or whose applications might be more vulnerable to hacking than an operating system. It is important to note, that while the operating system has access to this data, most operating system developers take great care to divorce these characteristics from the user itself to keep the individual user as anonymous as possible. It is a preferred aspect of the present technology that the identity of the user remains anonymous while still accessing enough data to provide properly targeted material.

Figure 1:
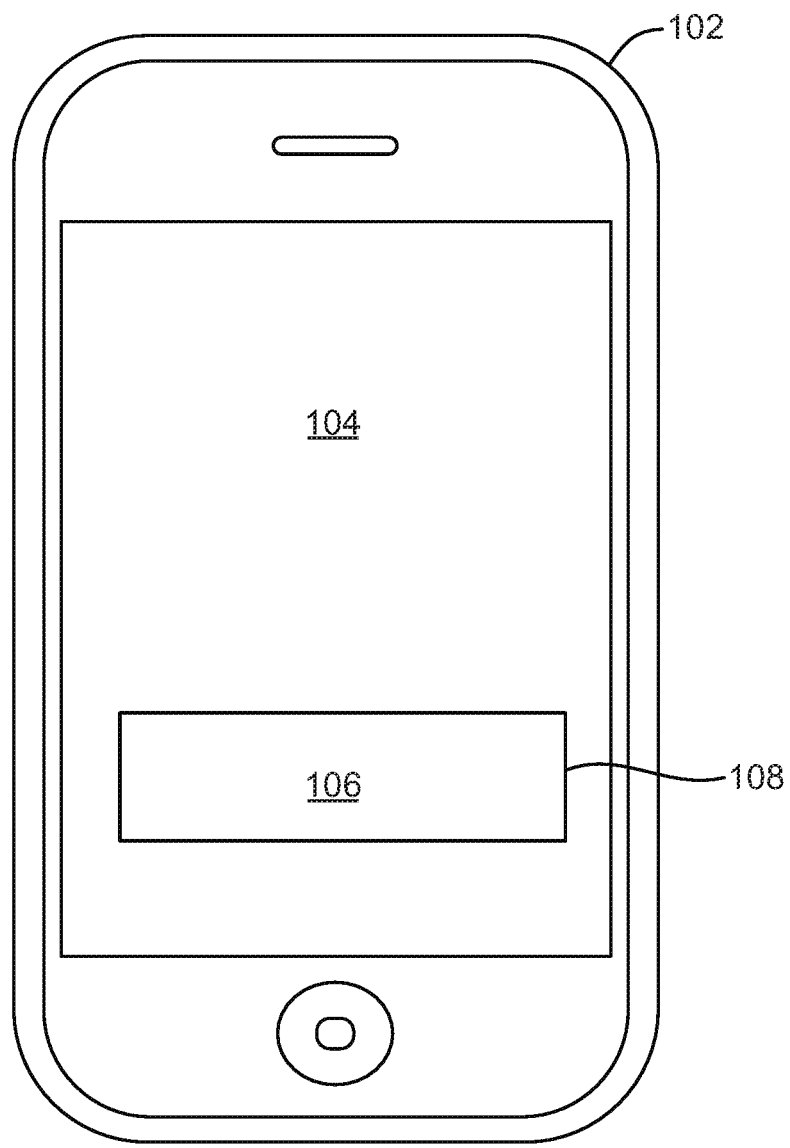
FIG. 1 illustrates an exemplary display presenting a targeted application within a primary application.

FIG. 1 illustrates an exemplary device 102 displaying a primary application 104 and a targeted application 106 in a view 108 within the primary application 104. As illustrated, the device 102 is a handheld computing device, for example, a smart phone, e.g., an IPHONE, by Apple Inc. of Cupertino, Calif. However, the device 102 can be any computing device such as a personal computer, laptop, or personal media-playing device; even a household appliance having a processor and a display can be used with the present technology.

The primary application 104 can be any application that reserves a view 108 or a window or a frame to display a second application 106. In some embodiments, the view has a standard dimension that is consistent across all potential primary applications. In some embodiments, the view 108 occupies about ten percent of the available screen area. Of course, the targeted application can occupy any desired portion of the primary application. However, the area of the targeted application should not be so large as to obscure or detract from the primary application, yet the targeted application should be large enough to view and interact with. Accordingly, the targeted application could be between one and sixty percent of the available screen area.

The targeted application 106 can be any application having content that is created with an audience in mind and can be targeted to that audience. For example, the application can be a game for children; a web application targeted at sports fans; or an advertisement for home improvement products targeted at home owners. In some preferred embodiments, the targeted application 106 can have some relationship to the primary application 104, such as a similarity in the target demographic for the audiences of both applications or in the nature of the content of the applications, etc.

Figure 2:
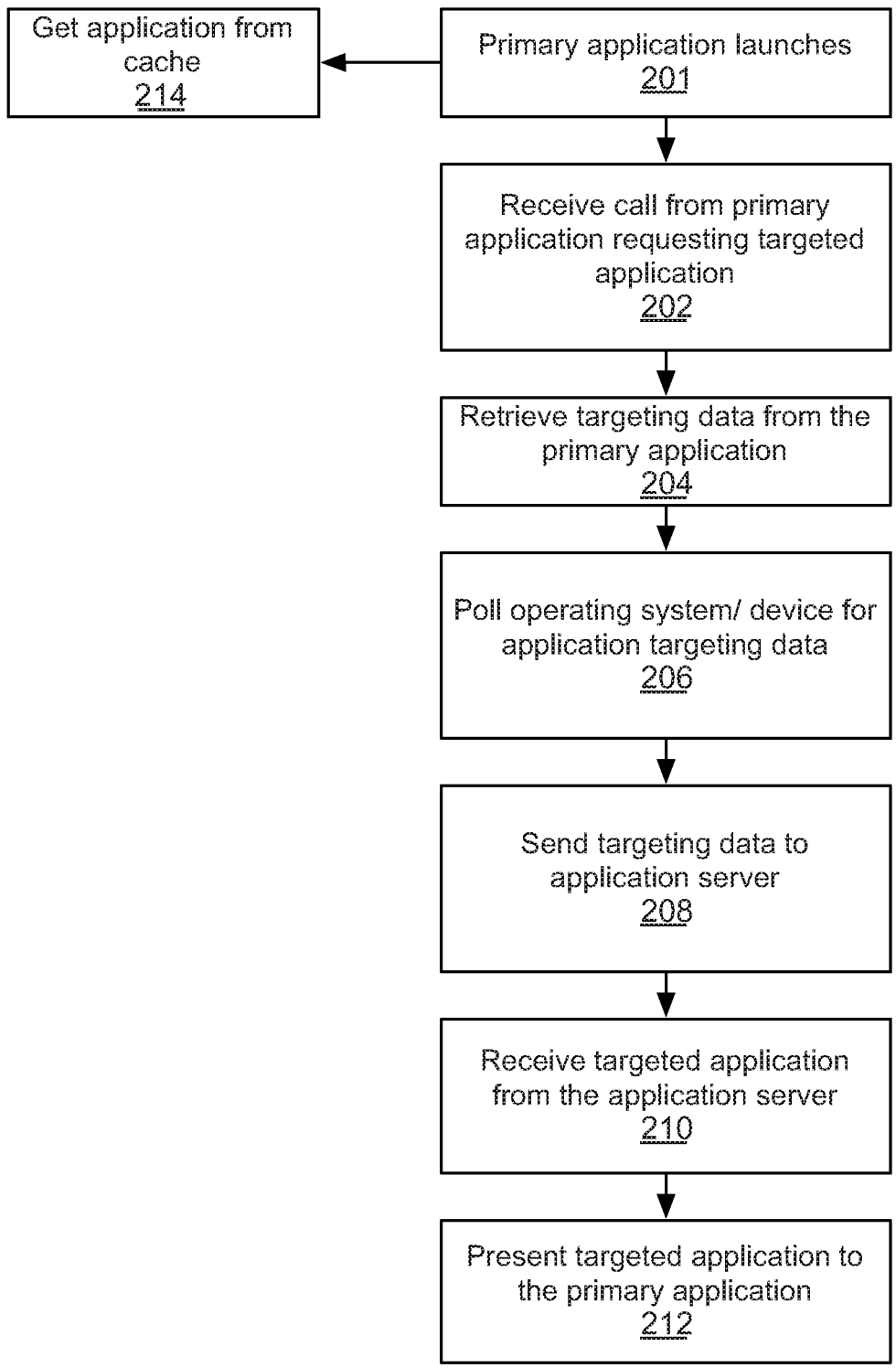
FIG. 2 is a flowchart illustrating a method embodiment for receiving a targeted application based on targeting data.

FIG. 2 illustrates an exemplary method embodiment for providing the targeted application for presentation within the primary application. When the primary application launches, it requests a targeted application for display in the view reserved for the targeted application and the request is received by a background process (202), a daemon.

The daemon has access to and collects various information to be used in determining which targeted application to provide to the primary application. This information, called targeting data, is collected from the application and the operating system.

The daemon receives some targeting data directly from the primary application (204). For example the primary application requests a targeted application that can fit reserved views of specified dimensions and/or number of views. The primary application can also request applications that meet other specifications, e.g., specifications such as content type (sports applications, retail applications, educational applications, etc.), target demographic information, etc. In some embodiments these specifications can be sent by the primary application as part of the request for a targeted application while in some embodiments these specifications can be sent in a separate communication.

Additionally, the daemon polls the operating system for additional targeting data (206). Since the daemon is a background process that is part of the operating system, it has access to a variety of targeting data that can be used to determine the optimum content to display to a user. This data can include user preferences, such as configuration preferences; it can also include data identifying specific applications installed or running on the device, or more general information about the applications identifying applications by broad category; it can include information identifying the primary application requesting the targeted application; it can include past internet search terms, topics extracted from electronic communications; it can include network information such as network state, roaming information, type of connection such as 3-G, 2-G, wi-fi, connection speeds, etc., and carrier information; it can include general user information such as country of residence, home zip code, phone number area code, language preferences, keyboard configuration, and parental restrictions; it can include device information such as screen dimensions, screen resolution, hardware capabilities, a device ID, etc.; it can include data extracted from a social network profile, for example what groups or applications the user is a member of, etc., or from an online store profile; and it can include other targeting data. The daemon can also have access to various hardware components of the device and can access targeting data such as GPS locations. In short, since the daemon is part of the operating system, it is deemed trusted enough to learn targeting data, some of which can be considered sensitive information, for the limited use of determining the optimum targeted content. While some examples of targeting data are listed above, they should not be considered limiting, but rather exemplary for the purposes of providing a fuller explanation of the present technology.

User protection and privacy is a primary concern, and one of the many benefits of the present technology is the protection of the user's sensitive information while gaining the benefit of using the data to determine the optimum content to display to a specific user. Among other protections provided by the present technology, the daemon can be trusted to not share any identifying information. The user's identity is separate from the targeting data used in selecting the targeted applications and not shared, thus keeping the user associated with the targeting data anonymous.

As introduced above, the daemon can learn of the primary application's identity from the operating system. While the primary application can send this information directly to the daemon in its request for a targeted application, in some environments, it is more desirable for the daemon to positively identify the application from the operating system itself. For example, in a system wherein all applications on the device originated from an associated store, the daemon can positively identify the application because the application comes from the store and is therefore highly likely to be correctly identified. Some stores cryptographically sign each application and include a unique key to identify the application. Every message sent by one application to another application on the device must identify itself with this key. In such systems each application can know with confidence that the calling application is as it appears, which makes the device more secure. Additionally, because the store is the source of the application, the store will often have more detailed information regarding the application and this data is not subject to manipulation by the software developer. Correctly identifying the application enables the application server to provide better targeted applications, to avoid presenting another ad for this same application to the user, and to track payments to the developer of the application.

The targeting data can be sent to an application server (208) to determine which targeted application should be presented to the user. The daemon can communicate with the application server using any suitable protocol, but in some embodiments, the daemon and the application server communicate via https. The application server can process the received targeting data using algorithms engineered for the purpose of selecting the targeted application. Importantly, the application server never learns the identity of the user, although it will use information about the user in determining the content to deliver to the user.

Once the application server determines which content to deliver to the user, it can send the content to the device and the daemon thereon. The daemon receives metadata describing the targeted application (210) and forwards the metadata to the primary application. The primary application then downloads the targeted application specified by the metadata and by storing the targeted application in a cache specific to the primary application. The primary application can then present a targeted application stored in its cache in the view field within the primary application (212).

Operating in this manner, the primary application can always present a targeted application that is already stored in its cache without calling the daemon. As illustrated in FIG. 2, when the primary application is launched (201) it can immediately display one of the targeted applications stored in its cache (214). If there are multiple targeted applications stored in the cache, the targeted application can present them in a round-robin fashion.

However, it is not desirable to allow the primary application to only retrieve a targeted application once and then always display it from the cache. Targeted applications can have limited life spans, or restrictions on the number of times the application can be presented. Such restrictions may be tied to the life of the targeted application or to only one session of the primary application. When the primary application requires a new targeted application it will request the targeted application from the daemon (204) as described above.

In some embodiments the application server can determine that multiple targeted applications should be sent to the device. In such embodiments, the first targeted application that is downloaded will be the first targeted application presented in the primary application.

In summary, the daemon functions as a proxy for the application server. The daemon receives requests for targeted applications and forwards targeted applications to the primary application. However, because the daemon is a process of the operating system it is also ideally suited to mine data that is needed by the application server to select the best targeted content for presentation in the primary application.

In addition to the proxy-like functions already described, in some embodiments the daemon can have additional proxy-like attributes. In such embodiments, targeted applications can be stored in a device-wide cache. The daemon can be configured to have limited logic, usually reserved for the application server, to select a targeted application from the pool of targeted applications stored in the device-wide cache. The targeted applications in a device-wide cache would include all applications downloaded from the application server over a certain period irrespective of which primary application for which the targeted applications were originally intended.

Figure 3:
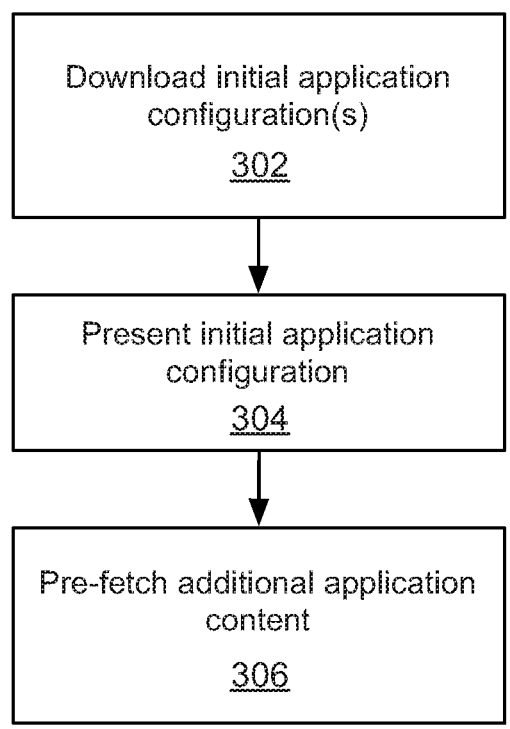
FIG. 3 is a flowchart illustrating a method embodiment for downloading the targeted application and initial views thereof.

FIG. 3 illustrates a process for downloading the full content of the targeted application that balances the competing interests of immediately displaying content so that the reserved view is not left blank with presenting a fully operational and interactive application. Initially, a static view of the targeted application is downloaded (302) and displayed (304).

In some embodiments, the targeted application can have more than one basic application configuration. Multiple basic configurations can be used, for example, in situations where the primary application can be presented in multiple presentation formats, e.g., landscape or portrait views corresponding to the availability of landscape and portrait orientations of the device display. In such embodiments, one or both of the basic application configurations can be initially downloaded (302).

After the initial application configuration has been downloaded it is displayed within the primary application (304). Initially, the targeted application displays as a static banner, the rest of the application content has been optimistically pre-fetched (306) the targeted application is available for full interaction.

While only a small portion of the targeted application is displayed, it can be interactive and full of rich content. The additional content can be pre-fetched so that the targeted application can present a functional user interface immediately upon being selected and then download additional resources as the user requests them by interacting with the application.

This method of downloading the targeted application overcomes some of the drawbacks related to serving the targeted application from a remote server. By initially downloading the initial application configurations, content is quickly made available for display on the device. This minimizes the possibility that the targeted-application view will be left blank while the full content is downloaded. The full content of the application is further downloaded and cached so that future interaction with the application will not be delayed by additional downloading operations. The application is optimistically downloaded so that all of the content is available immediately.

Figure 4:
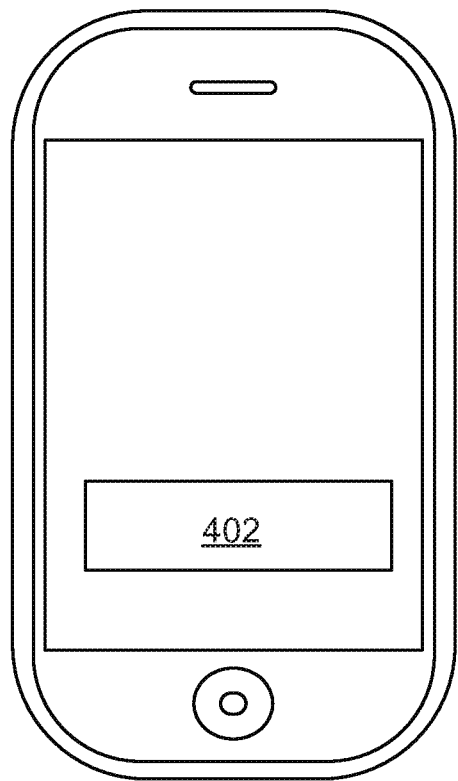
FIG. 4 illustrates multiple views of the targeted application corresponding to portrait and landscape display orientations.
Figure 4:
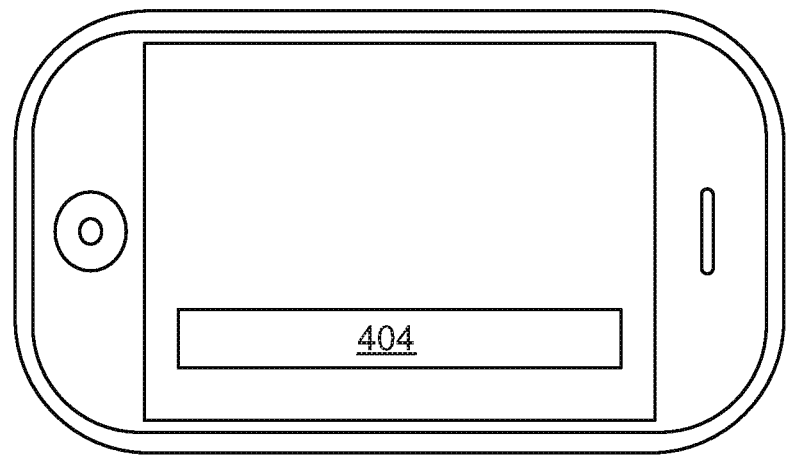

As mentioned above, multiple application configurations can be downloaded if the device has multiple possible presentation formats, such as portrait and landscape. In such aspects, it is anticipated that a view in portrait will not be as desirable in landscape. In some embodiments, it is desired that the targeted-application view and corresponding targeted-application configuration occupy only about ten percent of the display. As illustrated in FIG. 4, the targeted-application view in the portrait view (402) is fatter but thinner than the targeted-application view in the landscape view (404). Both views take up only about ten percent of the available screen area.

When the device is in a first orientation, for example a portrait orientation, and then rotates to a second orientation, for example a landscape orientation, the targeted-application view can resize along with the rest of the primary application, and the targeted-application configuration for that orientation can be displayed. When the device is rotated into a different orientation, the primary application will react to the change in orientation by rotating its view and resizing itself according to the new orientation. Along with this process, the primary application can present an alternate configuration for the targeted application that corresponds to the current orientation of the device which was downloaded along with the targeted application. In other words, a primary application that can be displayed in both landscape and portrait orientations will download a targeted application that can fit both orientations. When the device is rotated, the targeted application changes shape and animates to show content appropriate to the new aspect ratio. The content is still the same targeted application; it just has a slightly different representation for the new aspect ratio.

Figure 5:
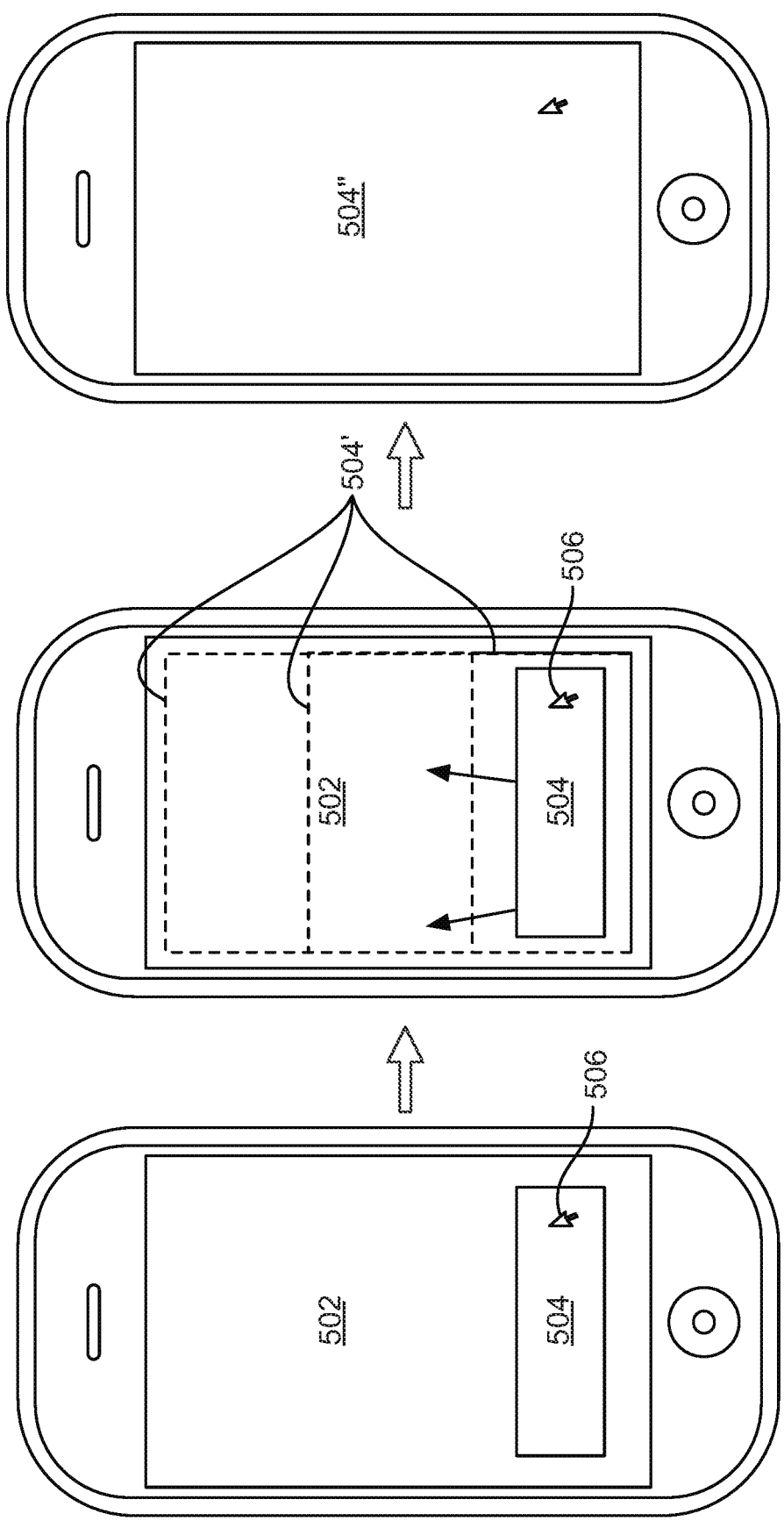
FIG. 5 illustrates a banner image for the targeted application that is a portion of the full screen view of the targeted application and a transition from the banner to the full screen view.

Except while the targeted application is being downloaded, the targeted application can be interactive. As illustrated in FIG. 5, the targeted application (504) can be selected using a pointing device (506). In the illustrated embodiment, the device has a touch screen input and thus a finger touch is illustrated, although any other selection mechanism is acceptable. Upon selection, the targeted application expands (504') to reveal its full view. In some embodiments, such as the embodiment illustrated in FIG. 5, the targeted application can be shown in a reduced view or a full view. At the left of FIG. 5, the targeted application is shown in a reduced view (504), while at the far right the full view (504") is illustrated. Upon selecting the reduced view (504), the targeted application morphs into its full view. The morphing is illustrated in the middle of FIG. 5 with 504' illustrating the transition between the reduced view (504) and the full view (504"). In other words, targeted applications can include banner images such that the targeted application shown in the primary application is a slice of a larger image that is seamlessly revealed when selected. This full screen targeted application provides the full interactive content of the targeted application.

In some aspects of the technology, the targeted application either advertises products for purchase or links to an online store to purchase products. In such aspects of the technology, it is undesirable to have the user navigate away from the application because such additional steps reduce the likelihood that a sale will be converted. Accordingly, the present technology provides for allowing a user to purchase products outside of the targeted application, while maintaining the appearance that the user is still operating within the targeted application.

Figure 6:
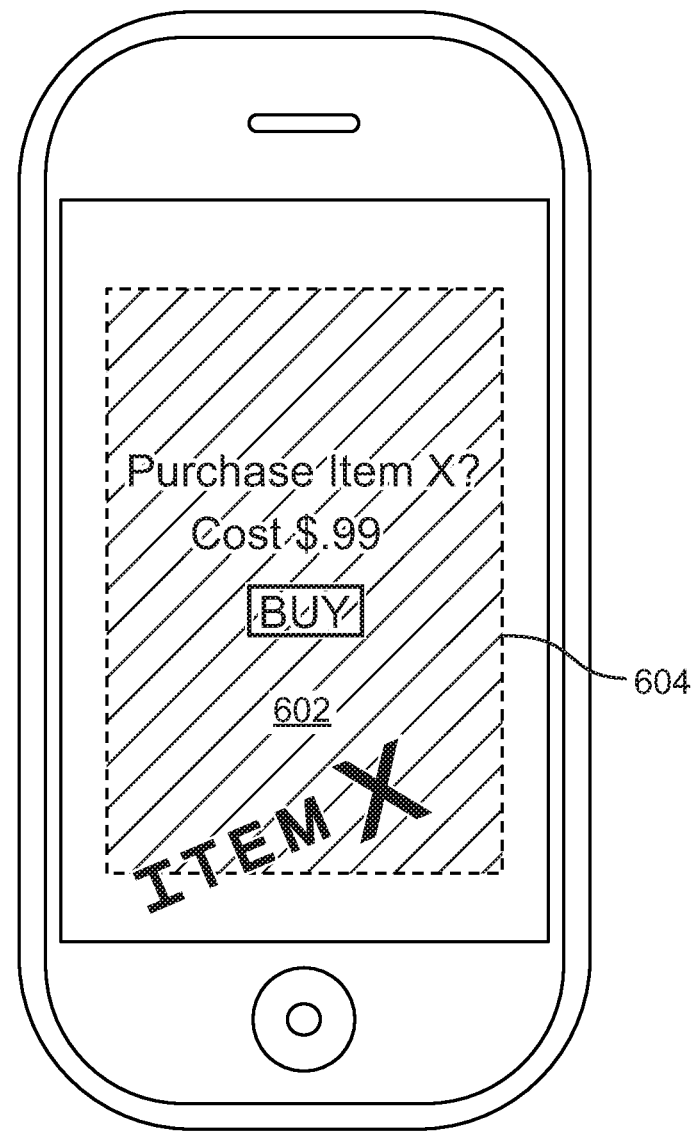
FIG. 6 illustrates a point-of-sale embodiment without navigating away from the targeted application.

FIG. 6 illustrates an exemplary user interface for allowing a user to purchase a product outside of the targeted application while the user experience maintains the appearance of being within the targeted application. As illustrated, the targeted application (602) is advertising ITEM X (a hypothetical item for purchase), which the user has selected to purchase. A purchase interface (604) is further shown overlaid the targeted application. In some embodiments, the purchase interface (604) is translucent or has transparent portions so that the targeted application (602) remains at least partially visible through the purchase interface. While the purchase interface (604) looks like it is part of the targeted application (602), it is really an extension of an online store. As an example, ITEM X could be a media item such as a movie or music, which is available for purchase from an online store, such as ITUNES, by Apple Inc., of Cupertino, Calif. In such an example, the targeted application could be a game or video or advertisement relating to the media item. The media item is not sold by the targeted application; it is sold by the online media store. Accordingly, the purchase interface is an extension of the online store and can be used to allow the user to purchase the media item from the store. To the user, it as though they bought the media item from the targeted application.

Figure 7:
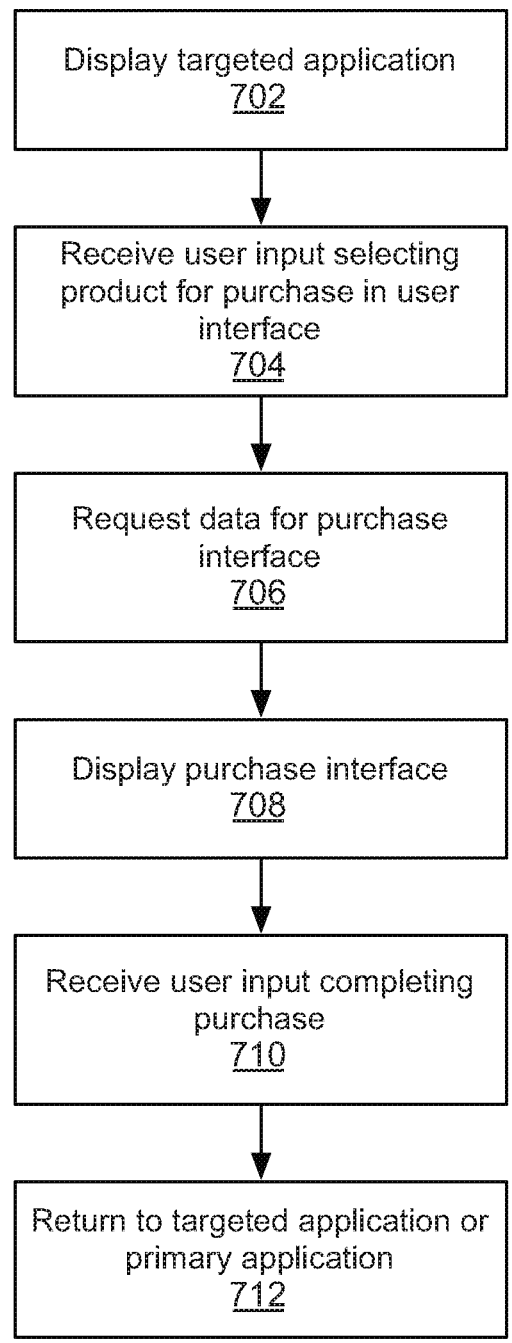
FIG. 7 is a flowchart illustrating a method embodiment for completing the sale of a product without navigating away from the targeted application.

FIG. 7 illustrates an exemplary method for providing a point of purchase that appears to be within the targeted application. The targeted application is displayed on the device and it advertises a product for sale (702). If a user wishes to purchase the item, the user can select the product for purchase using an input device and the input is detected by the system (704). Responsive to the received user input, the system can request data needed to provide a purchase interface (706). In some embodiments, the data needed to provide the purchase interface includes data representing the entire purchase interface, while in some embodiments it includes data representing information used to fill out fields in a template purchase interface.

Whether a template purchase interface is used with data from the store, or a purchase interface sent by the store is used, the purchase interface is displayed overlaid the targeted application (708). As addressed above, in some embodiments, the purchase interface is displayed as a substantially translucent or transparent interface so that at least portions of the targeted application can be seen through the purchase interface.

Receiving user inputs effective to complete the purchase completes the purchase (710). Responsive to those inputs, the system can communicate the confirmed purchase with the online store. The purchase interface can be removed and the user is returned to the targeted application or the primary application (712).

The targeted application can be a program, applet, image, object with hyperlinks, html application, video, flash object, etc. It can be for any purpose including, gaming, video, web interaction, advertising, document preparation, presenting, etc.

In some embodiments, the targeted application is an HTML5 web application for the purpose of advertising. In such embodiments, the primary application can call the operating system requesting an advertisement to be displayed in the view reserved for that purpose in the primary application. The operating system can use a daemon to collect advertisement targeting information that can be sent to an advertising server which can select and serve an advertisement that is best suited for display to the specific user in that primary application.

The device can download initial banner views of the advertisement suitable for display in any display orientation, which the primary application is expected to run. For example, the primary application might be expected to run in a portrait and a landscape orientation and, accordingly, the device will download the advertisement banners to be initially displayed.

The banners for portrait and landscape orientation can be standard sizes, which, in some embodiments, should not take up more than ten percent of the display area. When the orientation of the device changes from portrait to landscape or landscape to portrait, the banner corresponding to the orientation will be loaded and displayed.

The device can thereafter download the HTML5 version of the advertisement that contains interactive features to enrich the user's experience with the advertisement. Additionally, the device can preload a web archive of additional content associated with the ad so that the advertisement can present its full functional advertisement content without waiting for the additional content to be downloaded. However, it may be necessary or desired to download some content upon request.

In some embodiments, the banner, which is initially displayed, is actually only a small portion of the full targeted-advertisement application. When a user selects the banner, the full advertisement can be displayed. In such embodiments, an animation can show the banner portion of the targeted-advertisement application grow into the full advertisement, or the animation can show the primary application being pulled back to reveal the full ad. Other animations are possible. It is also possible that the banner is just a link to the full targeted-advertisement application, which can be loaded upon selection of the banner.

The full targeted-advertisement application can have a variety of interactive functions. The advertisement can present a game, information, or any other desired content. The advertisement can also provide a point of purchase for one or more advertised items. While it will most commonly be the case that the advertisement is providing a link to an online store that is the entity actually selling the advertised items, to the user, it looks as if the advertisement is the entity selling the item because the user will not have to leave the advertisement to complete the purchase.

When a user desires to purchase an advertised product, the user can select the product from the advertisement. The advertisement can request information to complete a purchase interface, or can request a purchase interface directly from the store. The purchase interface can be displayed directly in, or above, the advertisement program and thus the purchase is completed without navigating away from the advertisement program.

The present technology also protects the operating system and the primary application from unstable and malicious targeted applications by running the targeted application as a separate process. In some embodiments, the targeted application is run in a virtual machine type environment or given access to limited resources. In some embodiments, the targeted application is run in a sandbox so that it cannot effect the primary application or operating system. Running the targeted application in a sandboxed environment allows the targeted application to crash or freeze and be quit without effecting the primary application. It also prevents the targeted application from including malicious content or extracting data from the primary application.

Figure 8:
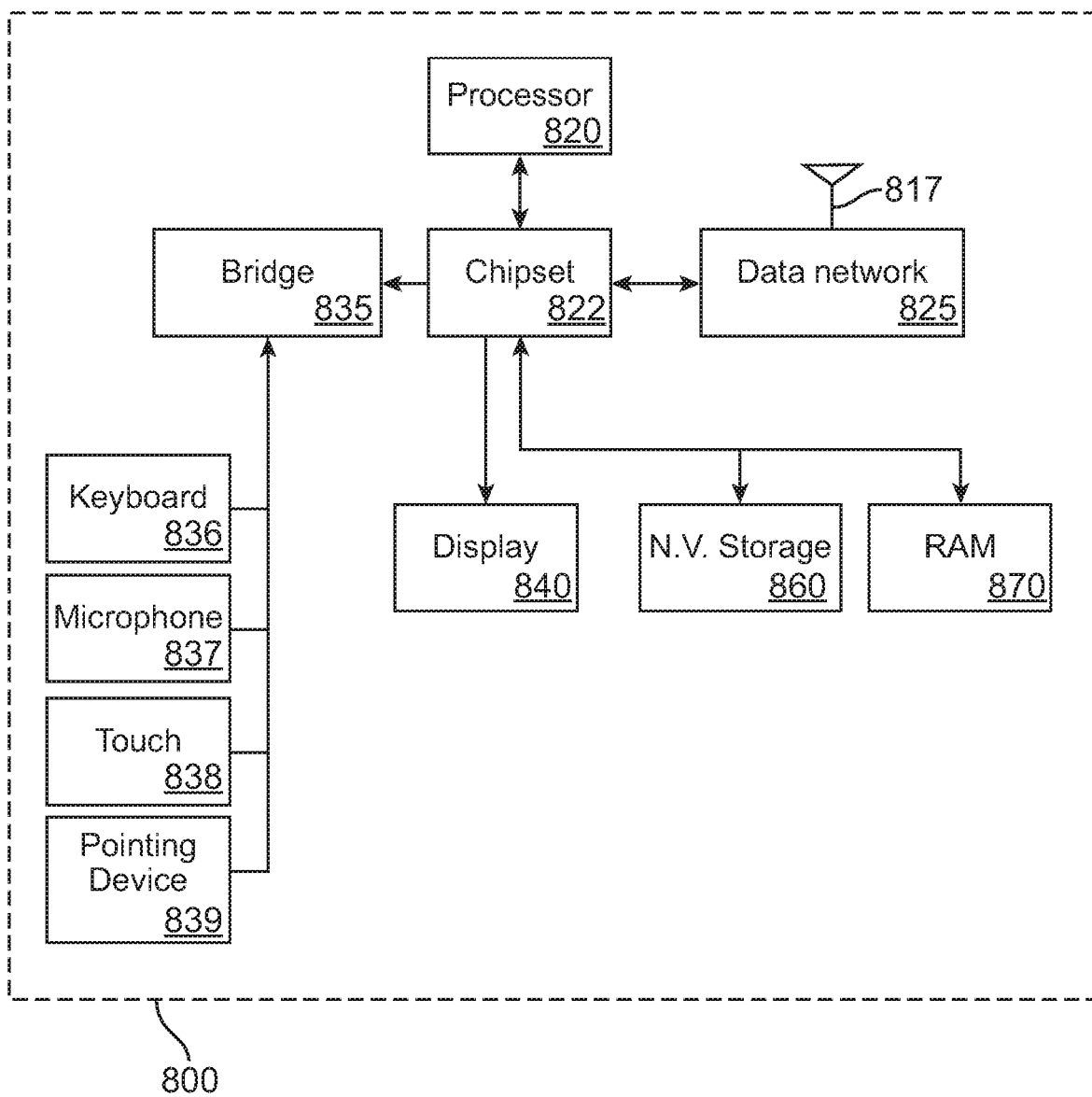
FIG. 8 is a schematic illustration of an exemplary system embodiment.

FIG. 8 illustrates a computer system 800 used in executing the described method. Computer system 800 is an example of computer hardware, software, and firmware that can be used to implement disclosures above. System 800 includes a processor 820, representative of any number of physically and/or logically distinct resources capable of executing software, firmware, and hardware configured to perform identified computations. Processor 820 communicates with a chipset 822 that can control input to and output from processor 820. In this example, chipset 822 outputs information to display 840 and can read and write information to non-volatile storage 860, which can include magnetic media and solid-state media, for example. Chipset 822 also can read data from and write data to RAM 870. A bridge 835 for interfacing with a variety of user interface components can be provided for interfacing with chipset 822. Such user interface components can include a keyboard 836, a microphone 837, touch detection and processing circuitry 838, a pointing device, such as a mouse 839, and so on. In general, inputs to system 800 can come from any of a variety of sources, machine-generated and/or human-generated.

Chipset 822 also can interface with one or more data network interfaces 825 that can have different physical interfaces 817. Such data network interfaces can include interfaces for wired and wireless local area networks, for broadband wireless networks, as well as personal area networks. Some applications of the methods for collecting data in the location-popularity index and ranking and returning location search results disclosed herein can include receiving data over physical interface 817 or be generated by the machine itself by processor 820 analyzing data stored in memory 860 or 870. Further, the machine can receive inputs from a user via devices 836, 837, 838, 839 and execute appropriate functions, such as browsing functions, by interpreting these inputs using processor 820.

Methods according to the above-described examples can be implemented using computer-executable instructions that are stored or otherwise available from computer-readable media. Such instructions comprise, for example, instructions and data which cause or otherwise configure a general purpose computer, special purpose computer, or special-purpose processing device to perform a certain function or group of functions. Portions of computer resources used can be accessible over a network. The computer executable instructions may be, for example, binaries, intermediate-format instructions such as assembly language, firmware, or source code, including transitory signals carrying the instructions. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   executing, by at least one processor of a mobile computing device, a first mobile application in a first sandboxed environment;
   causing, by the at least one processor of the mobile computing device, a graphical user interface of the first mobile application resulting from the execution of the first mobile application to be displayed on a display;
   in response to receiving a first input received within the graphical user interface of the first mobile application, sending, by the at least one processor, a request to an operating system of the mobile computing device for a billing application on the mobile computing device, the billing application executing on the mobile computing device outside of the first sandboxed environment, the billing application having access through the operating system to account data comprising user and device data by communicating with a daemon that is a privileged process of the operating system, and wherein the operating system prohibits the first mobile application from accessing the account data; and
   causing, by the at least one processor, a second graphical user interface resulting from the execution of the billing application to be displayed on the display.

2. The computer-implemented method of claim 1, wherein the second graphical user interface overlays the graphical user interface of the first mobile application, and appearing as if it is part of the first mobile application.

3. The computer-implemented method of claim 1, wherein the executing of the first mobile application by the at least one processor further comprises calling the operating system to request the second graphical user interface.

4. The computer-implemented method of claim 1, wherein the request for the billing application comprises an operating system interprocess communication by an operating system process.

5. The computer-implemented method of claim 4, wherein the interprocess communication comprises an API that enables the first mobile application to request information from the billing application.

6. The computer-implemented method of claim 4, wherein the interprocess communication is a proxy for the billing application.

7. The computer-implemented method of claim 6, wherein the interprocess communication receives metadata from the billing application and forwards the metadata to the first mobile application.

8. The computer-implemented method of claim 1, wherein the first mobile application is published in an online store.

9. The computer-implemented method of claim 1, wherein the second graphical user interface is a template that is part of the billing application and data displayed within the second graphical user interface originates from an online store.

10. The computer-implemented method of claim 1, wherein communications between the first mobile application and the billing application on the mobile computing device are identified with a unique key which the operating system uses to identify the first mobile application prior to the causing the second graphical user interface to be displayed.

11. The computer-implemented method of claim 10, wherein an online store cryptographically signs the first mobile application and the billing application and the online store includes the unique key.

12. The computer-implemented method of claim 1, further comprising:
receiving a second input within the second graphical user interface of the billing application effective to conduct a transaction; and
after receiving the second input within the second graphical user interface, removing the second graphical user interface from the display.

13. A system comprising:
one or more processors; and
at least one computer-readable storage medium having stored therein instructions which, when executed by the one or more processors, cause the one or more processors to perform operations comprising:
execute, by at least one processor of a mobile computing device, a first mobile application in a first sandboxed environment;
causing, by the at least one processor of the mobile computing device, a graphical user interface of the first mobile application resulting from the execution of the first mobile application to be displayed on a display;
in response to receiving a first input received within the graphical user interface of the first mobile application, sending, by the at least one processor, a request to an operating system of the mobile computing device for a billing application on the mobile computing device, the billing application executing on the mobile computing device outside of the first sandboxed environment, the billing application having access through the operating system to account data comprising user and device data by communicating with a daemon that is a privileged process of the operating system, and wherein the operating system prohibits the first mobile application from accessing the account data; and
causing, by the at least one processor, a second graphical user interface resulting from the execution of the billing application to be displayed on the display.

14. The system of claim 13, wherein the second graphical user interface overlays the graphical user interface of the first mobile application, and appearing as if it is part of the first mobile application.

15. The system of claim 13, wherein the execution of the first mobile application by the at least one processor further comprises calling the operating system to request the second graphical user interface.

16. The system of claim 13, wherein the request for the billing application comprises an interprocess communication by an operating system process.

17. The system of claim 16, wherein the interprocess communication comprises an API that enables the first mobile application to request information from the billing application.

18. The system of claim 16, wherein the interprocess communication is a proxy for the billing application.

19. The system of claim 18, wherein the interprocess communication receives metadata from the billing application and forwards the metadata to the first mobile application.

20. The system of claim 13, wherein the first mobile application is published in an online store.

21. The system of claim 13, wherein the second graphical user interface is a template that is part of the billing application and data displayed within the second graphical user interface originates from an online store.

22. A non-transitory computer-readable storage medium having stored therein instructions which, when executed by one or more processors, cause the one or more processors to:
execute, by at least one processor of a mobile computing device, a first mobile application in a first sandboxed environment;
causing, by the at least one processor of the mobile computing device, graphical user interface of the first mobile application resulting from the execution of the first mobile application to be displayed on a display;
in response to receiving a first input received within the graphical user interface of the first mobile application, sending, by the at least one processor, a request to an operating system of the mobile computing device for a billing application on the mobile computing device, the billing application executing on the mobile computing device outside of the first sandboxed environment, the billing application having access through the operating system to account data comprising user and device data by communicating with a daemon that is a privileged process of the operating system, and wherein the operating system prohibits the first mobile application from accessing the account data; and
causing, by the at least one processor, a second graphical user interface resulting from the execution of the billing application to be displayed on the display.

23. The non-transitory computer-readable storage medium of claim 22, wherein the second graphical user interface overlays the graphical user interface of the first mobile application, and appearing as if it is part of the first mobile application.

\* \* \* \* \*